United States Patent [19]

Geyler, Jr.

[11] Patent Number: 5,143,115
[45] Date of Patent: Sep. 1, 1992

[54] BI-DIRECTIONAL PRESSURE RELIEF VALVE

[75] Inventor: Arthur H. Geyler, Jr., Rockford, Ill.

[73] Assignee: Delta Power Hydraulic Co., Rockford, Ill.

[21] Appl. No.: 833,978

[22] Filed: Feb. 11, 1992

[51] Int. Cl.$^5$ .............................................. F16K 17/18
[52] U.S. Cl. ................................. 137/493; 137/454.5
[58] Field of Search ............................. 137/454.5, 493

[56] References Cited

U.S. PATENT DOCUMENTS 4,228,818 10/1980 Nelson .............................. 137/493 X
5,072,752 12/1991 Kolchinsky ........................... 137/493

OTHER PUBLICATIONS

Crossover Relief Valve A6A60 by Sterling Hydraulics Limited (date unknown but prior to 1991) undated.
Crossover Relief Valves A6A125, A6B125 by Sterling Hydraulics Limited (date unknown but prior to 1991) undated.

Primary Examiner—Robert G. Nilson
Attorney, Agent, or Firm—Vernon J. Pillote

[57] ABSTRACT

The bi-directional pressure relief valve comprising a valve casing defining a valve bore, a valve chamber at one end of the valve bore and a pressure chamber communicating with the opposite end of the valve bore. The valve chamber has a first port communicating with a first fluid line and a second port communicating with a second fluid line and the first port having a valve seat coaxial with the bore with a cross-sectional area smaller than the cross-sectional area of the valve bore. A poppet type valve member is slidable in the bore and has a reduced end portion engageable with the seat to shut off flow between the first and second fluid lines and a spring yieldably urges the valve member to a closed position. A first chamber vent passage communicates the pressure chamber with the first fluid line and first check valve in the first vent passage is arranged to close and block flow from the first fluid line to the pressure chamber when the fluid pressure at the first fluid line is greater than the fluid pressure in the pressure chamber. A second chamber vent passage communicates the pressure chamber with the second fluid line and a second check valve in the second vent passage is arranged to close and block flow from the second fluid line to the pressure chamber, when the fluid pressure at the second fluid line is greater than the fluid pressure in the pressure chamber.

11 Claims, 1 Drawing Sheet

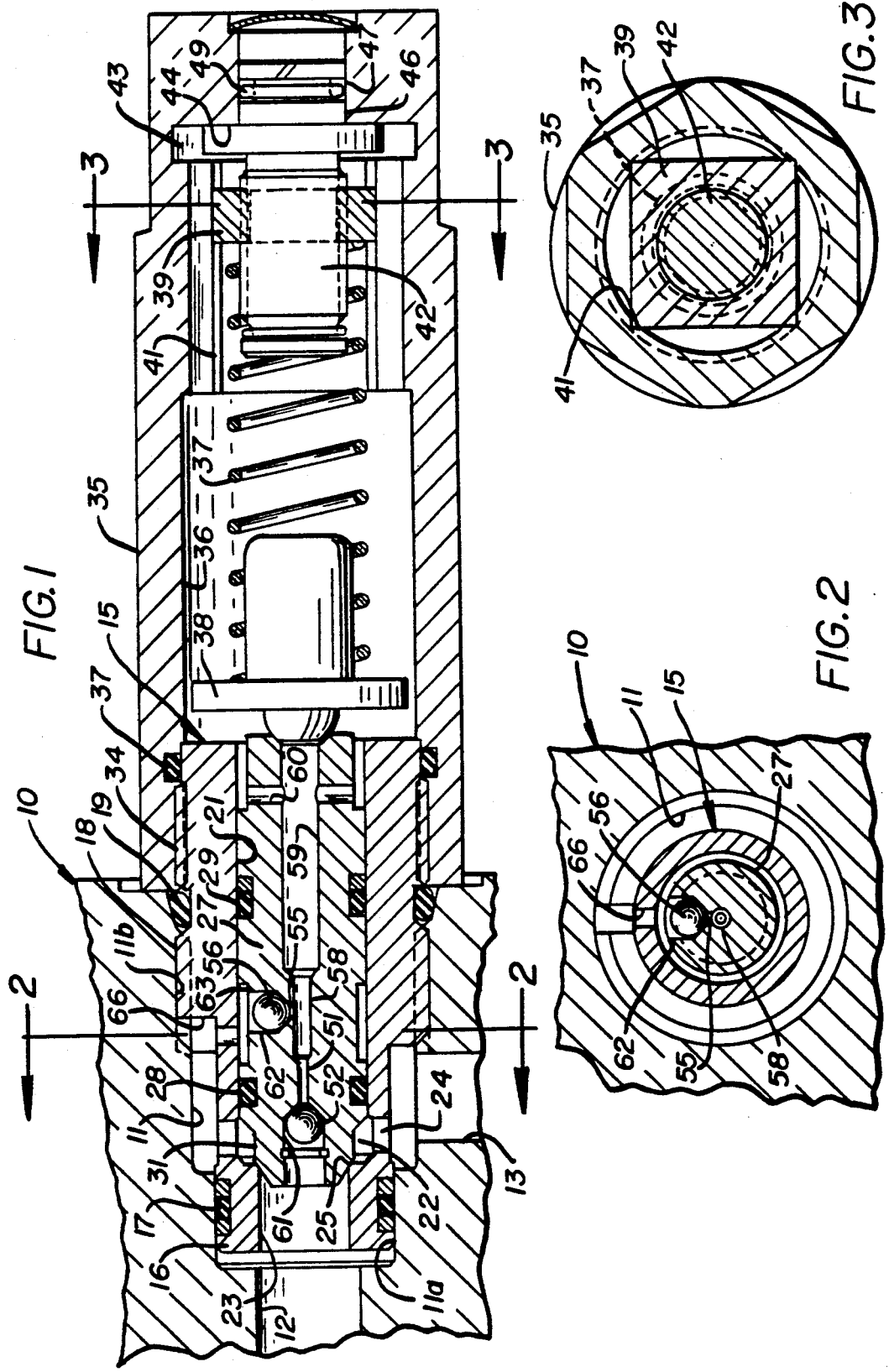

BI-DIRECTIONAL PRESSURE RELIEF VALVE

In some hydraulic systems, for example hydraulic systems which include an hydraulic motor and flow control means for reversibly supplying fluid to the motor, it is desirable to provide pressure relief protection for the motor when it is operated in either direction. It is common practice to use two pressure relief valves, one arranged to provide pressure relief when the motor is operated in one direction and a second to provide pressure relief when the motor is operated in the opposite direction.

It is an object of the present invention to provide a bi-directional pressure relief valve which is operative to relieve pressure in either direction between two fluid lines in an hydraulic system.

Another object of this invention is to provide a pressure relief valve in accordance with the foregoing object and which is operative to provide equal pressure settings in either direction with one adjustment.

SUMMARY OF THE INVENTION

The bi-directional relief valve of the present invention comprises a valve casing means defining a valve bore and a valve chamber at one end of the valve bore and a pressure chamber communicating with the opposite end of the valve bore. The valve casing means has a first port for communicating a first fluid line with the valve chamber and a second port for communicating a second fluid line with the valve chamber, the first port having a valve seat coaxial with the bore and the valve seat having a cross-sectional area smaller than the cross-sectional area of the valve bore. A poppet type valve member has a first portion slidable in the bore and a reduced portion on one end engageable with the seat to shut off flow between the first and second ports and spring means yieldably urges the valve member toward the valve seat to a closed position. A first chamber vent passage means communicates the pressure chamber with the first port when the valve member is in a closed position and first check valve means in the first vent passage means is arranged to close and block flow from the first port to the pressure chamber when the fluid pressure at the first port is greater than the fluid pressure in the pressure chamber. A second chamber vent passage means communicates the pressure chamber with the second port when the valve member is in the closed position and a second check valve means in the second vent passage means is arranged to close and block flow from the second port to the pressure chamber, when the fluid pressure at the second port is greater than the fluid pressure in the pressure chamber.

The valve will operate as a direct acting relief valve when the first port communicates with a pressure supply line and the second port communicates with a reservoir or return line. The valve will also function as a direct acting pressure relief valve when the second port is the pressure port and the first port is connected to the reservoir or a return line. Further, the valve will operate as a differential relief valve when the lowest pressure at either the first or the second port is above atmospheric pressure and under these conditions the valve will relieve pressure from the high pressure port to the low pressure port when the pressure at the high pressure port exceeds the pressure at the low pressure port by an amount sufficient to produce a force that overcomes the closing force of the spring. The valve seat is preferably formed with an area approximately equal to one-half the cross-sectional area of the valve port such that the net front seat area on the valve member that is exposed to fluid pressure at the first port, is substantially equal to the net front differential area on the valve member that is exposed to pressure at the second port. With this arrangement, the valve will operate at substantially the same pressure in either direction at the same spring setting. The spring setting is adjustable to vary the relief pressure and, in the preferred embodiment, the spring compression adjusting means includes a screw that is supported for rotation but is constrained against axial movement and a follower that is movable axially relative to the casing and constrained against rotational movement.

BRIEF DESCRIPTION OF THE DRAWINGS

FIG. 1 is a longitudinal sectional view through a valve embodying the present invention;

FIG. 2 is a transverse sectional view taken on the plane 2—2 of FIG. 1; and

FIG. 3 is a transverse sectional view taken on the plane 3—3 of FIG. 1.

DETAILED DESCRIPTION

In the preferred embodiment illustrated, the valve is made for insertion and removal as a cartridge from a valve body or manifold body designated generally by the numeral 10. The body 10 has a cavity 11 that opens at one side of the body and first and second fluid passage means 12 and 13 that communicate with the cavity. The cavity has a reduced diameter portion 11a at its inner end and an internally threaded portion 11b adjacent its outer end. The valve member includes a cage 15 with a reduced diameter inner end portion 16 sealed to the wall 11a of the cavity as by O-ring 17 at a location intermediate the first and second ports, and an externally threaded portion 18 that is threadedly receivable in the internally threaded portion 11b of the cavity. A means such as an O-ring 19 is provided to seal the interface between the cage 15 and body 10 at a location adjacent the outer end of the cavity.

The cage 15 has a valve bore 21 and a valve chamber 22 at one end of the bore. A first valve port 23 in the cage communicates the first fluid passage 12 with the valve chamber 22 and a second valve port comprising one or more openings 24 in the cage, communicates the valve chamber with cavity 11 and the second fluid passage 13. The first fluid passage 23 defines a valve seat 25 at its juncture with the valve chamber 22. The valve seat 25 has a cross-sectional area smaller than the valve bore and, for reasons pointed out more fully hereinafter, preferably has a cross-sectional area substantially one-half the cross-sectional area of the valve bore.

A valve member 27 is mounted for sliding movement in the bore and slidably sealed thereto as by O-rings 28 and 29. The valve member has a reduced portion 31 on one end thereof engageable with the seat 25 to shut off flow between the first and second ports when the valve is in a closed position. A cap member 35 is mounted on the cage 19 as by threaded engagement therewith at 34 and sealed thereto as by an O-ring 37. The cap member 35 forms a pressure chamber 36 at the end of the valve bore 21 remote from the valve chamber and a compression spring 37 is disposed in the cap member between a spring guide 38 that engages one end of the valve member, and a follower nut 39. In the preferred embodiment illustrated, the follower nut is slidably and non-rotatably received in an internally fluted or grooved end portion 41 of the cap member. An adjusting screw 42 threadedly engages the follower 39 and has a collar 43 rigid therewith engages a shoulder 44 on the cap member 35. A stem portion 46 on the adjusting screw is rotatably supported in a bore 47 in the end of the retainer and sealed thereto as by an O-ring 49. The adjusting screw is adapted to be rotated by a tool such as a screw driver or wrench, to adjust the compression on spring 37 and hence the pressure at which the valve member will move to an open or pressure release position.

A first vent passage 51 is provided for communicating the pressure chamber 36 with the first port 23 and first fluid passage 12 when the valve member is in a closed position, and a first check valve 52 is provided in the first vent passage and arranged to close and block flow from the first fluid passage to the pressure chamber when the fluid pressure in the first fluid passage is greater than the fluid pressure in the pressure chamber. A second chamber vent passage 55 is provided for communicating the pressure chamber 36 with the second passage means 13 and second port 24 when the valve member is in its closed position, and a second check valve means 56 is provided in the second vent passage and arranged to close and block flow from the second fluid passage means to the pressure chamber when the fluid pressure in the second fluid passage means is greater than the fluid pressure in the pressure chamber. As shown in FIG. 1, the first and second vent passages 51 and 55 communicate through a common passageway 58, 59 and 60 with the pressure chamber. The first check valve 52 is disposed in a counterbore 61 in the valve member and is arranged to close to block flow from the first port to the pressure chamber. Check valve 56 is disposed in a counterbore 62 in the side of the valve member and communicates with a recess 63 in the valve member at a location intermediate the O-ring seals 28 and 29. A vent control opening 66 is provided in the cage member and communicates through cavity 11 with the second fluid passage 13 and second ports 24. The second vent passage is arranged to communicate the pressure chamber 36 with the cavity 11 and the second fluid passage 13 when the valve member is closed and to continue communication until the valve member moves to a position in which the recess 63 is out of communication with the port 66.

From the foregoing it is believed that the construction and operation of the bi-directional pressure relief valve will be readily understood. The valve will operate as a direct acting relief valve when the first fluid passage 12 is the pressure passage and the second fluid passage 13 is the reservoir or return passage. Under these conditions, the fluid pressure in the first fluid passage 12 will act on a net or effective front seat area on the valve member that is substantially equal to the cross-sectional area of the seat 25, and the second check valve 56 will open and vent the pressure chamber to the second fluid passage 13. When the force produced by the fluid pressure in the first fluid passage 12 acting on the seat area of the valve member produces a force sufficient to overcome the closing force of spring 37, the valve will begin to move away from the seat and, as it moves away from the seat, the pressure on the diffential area between the seat and the outer diameter of the valve member increases and aids in moving the valve member toward an open position. Thus, the valve member produces a low pressure rise as it moves toward an open position.

The valve member will also operate as a direct acting relief valve when the second fluid passage 13 is the high pressure passage and the first fluid passage 12 is the reservoir or return passage. When the valve member is closed, the first check valve 52 will open to vent the pressure chamber 36 to the first fluid passage 12 and the high pressure at the second fluid passage 13 will act on the differential area of the valve member, that is the net front area between the valve seat area and the outer diameter of the valve member. When the pressure at the second fluid passage, acting on the differential area produces a force that overcomes the closing pressure produced by the spring, the valve will move toward an open position to relieve the fluid pressure at the second fluid passage.

The valve can also operate as a differential relief valve to control the differential pressure between the first and second ports. More specifically, neither check valve opens to vent the pressure chamber until the pressure in the pressure chamber exceeds the pressure at either port 1 or port 2, whichever is lowest. Thus, this effectively maintains the pressure in the pressure chamber at the pressure of the lowest valve port and this pressure in the pressure chamber, acting on the rear end of the valve member, effectively aids the spring in holding the valve member closed. Therefore, the valve member does not begin to open until the pressure at the high pressure port acting on the area of the valve member exposed to pressure at that port, produces a force on the valve sufficient to overcome the spring force and the fluid pressure force acting on the rear end of the valve member.

As previously described, the cross-sectional area of the valve seat is preferably approximately one-half the cross-sectional area of the valve bore so that the net or effective front area of the valve member that is exposed to fluid pressure at the first port 12 is substantially equal to the net or effective differential area, that is the area of the valve bore less the area of the valve seat, that is exposed to the fluid pressure at the second port. With this arrangement, the valve will operate in either direction as substantially the same pressure, for a given pressure setting on spring 37. Accordingly, only one pressure setting is required for operation in both directions. Alternatively, for some applications, the cross-sectional area of the valve seat can be made other than one-half the cross-sectional area of the valve bore so that the valve will operate in one direction at one pressure and at a different pressure in the other direction.

As will be seen from FIG. 1, the recess 63 in the valve member communicates with the vent control opening 66 when the valve member is closed and will continue to communicate with the vent control port until the valve member has moved a selected distance away from its closed position. When the recess 63 moves out of communication with the opening 66, venting of the pressure chamber 36 through a second vent passage 55 is interrupted and this hydraulically limits further opening of the valve member due to build up of pressure in the pressure chamber 36.

The embodiments of the invention in which an exclusive property or privilege is claimed are defined as follows:

1. A bi-directional pressure relief valve for relieving pressure in either direction between two fluid lines in a hydraulic system, the valve comprising valve casing means defining a valve bore, a valve chamber at one end of the valve bore and a pressure chamber communicating with an end of the valve bore remote from the valve chamber, a first port for communicating a first fluid line with the valve chamber, a second port for communicating a second fluid line with the valve chamber, the first port having a valve seat coaxial with said bore and the valve seat having a cross-sectional area smaller than the cross-sectional area of the valve bore, a valve member having a first portion slidable in the bore and reduced portion on one end engageable with the seat to shut-off flow between the first and second ports, spring means yieldably urging said valve member toward said valve seat to a closed position, first chamber vent passage means communicating said pressure chamber with said first port when the valve member is in the closed position and first check valve means in said first vent passage means arranged to close and block flow from said first port to said pressure chamber when the fluid pressure at said first port is greater than the fluid pressure in said pressure chamber, second chamber vent passage means communicating said pressure chamber with said second port when the valve member is in the closed position and second check valve means in said second vent passage means arranged to close and block flow from the second port to said pressure chamber when the fluid pressure at the second port is greater than the fluid pressure in the pressure chamber.

2. A bi-directional pressure relief valve according to claim 1 wherein the cross-sectional area of the valve seat is approximately one-half the cross-sectional area of the valve bore.

3. A bi-directional pressure relief valve according to claim 1 wherein said first check valve means is in said valve member.

4. A bi-directional pressure relief valve according to claim 1 wherein said second check valve means is in said valve member.

5. A bi-directional pressure relief valve means according to claim 1 wherein said first and said second check valve means are in said valve member.

6. A bi-directional pressure relief valve according to claim 1 wherein said spring means is a compression spring disposed in said pressure chamber, and means for adjusting the compression on said compression spring.

7. A bi-directional pressure relief valve according to claim 1 wherein said first vent passage means opens at said one end of the valve member and said second vent passage means opens at a side of the valve member.

8. A bi-directional pressure relief valve according to claim 1 wherein said second vent passage means includes a vent control port intermediate the ends of the valve bore and passage means communicating the vent control port with said second fluid line, the second vent control passage means also including an outer groove intermediate the ends of the first portion of the valve member arranged to communicate with said vent control port when the valve member is in the closed position and until the valve member moves a preselected distance away from the closed position.

9. A bi-directional pressure relief valve for relieving pressure in either direction between two fluid lines in an hydraulic system, the valve including a body having a cavity opening at one side of the body, a first fluid passage means communicating with the cavity for communicating a first fluid line with the cavity and a second fluid passage for communicating with a second fluid line with the cavity, cage means in the cavity and having first seal means engaging a wall of the cavity intermediate the first and second fluid passage means and a second seal means engaging a wall of the cavity intermediate the second fluid passage means and said one side of the body, the cage means having a valve bore and a valve chamber at one end of the valve bore, a first valve port communicating the first fluid passage means with the valve chamber, and a second valve port for communicating the second fluid passage means with the valve chamber, the first fluid passage means having a valve seat coaxial with the valve bore and the valve seat having a cross-sectional area smaller than the valve bore, a valve member having a first portion slidable in the bore and a reduced portion on one end engageable with the seat to shut off flow between the first and second ports, spring means yieldably urging the valve member toward said seat to a closed position, means attached to said cage defining a pressure chamber at the end of the bore remote from the valve chamber, first chamber vent passage means communicating the pressure chamber with said first fluid passage means when the valve member is in a closed position and first check valve means in said first vent passage means arranged to close and block flow from the first fluid passage means to the pressure chamber when the fluid pressure in the first fluid passage means is greater than the fluid pressure in the pressure chamber, second chamber vent passage means communicating the pressure chamber with said second passage means when the valve member is in the closed position, and second check valve means in said second vent passage means arranged to close and block flow from the second fluid passage means to the pressure chamber when the fluid pressure in the second fluid passage means is greater than the fluid pressure in the pressure chamber.

10. A bi-directional relief valve according to claim 9 wherein the first vent passage means opens at said one end of the valve member.

11. A bi-directional relief valve according to claim 9 wherein said second vent passage means includes a vent control port in the cage means intermediate the ends of the valve bore and communicating with the second fluid passage means, the second vent control passage means also including an outer groove in the valve member intermediate the ends of the first portion of the valve member and arranged to communicate with the vent control port when the valve member is in the closed positon and until the valve member moves a preselected distance away from the closed position.

* * * * *